United States Patent
Hung

(10) Patent No.: US 9,762,878 B2
(45) Date of Patent: Sep. 12, 2017

(54) AUTO WHITE BALANCE USING INFRARED AND/OR ULTRAVIOLET SIGNALS

(71) Applicant: GOOGLE INC., Mountain View, CA (US)

(72) Inventor: Szepo Robert Hung, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/885,377

(22) Filed: Oct. 16, 2015

(65) Prior Publication Data

US 2017/0111623 A1   Apr. 20, 2017

(51) Int. Cl.
*H04N 9/73* (2006.01)
*H04N 1/60* (2006.01)

(52) U.S. Cl.
CPC .......... *H04N 9/735* (2013.01); *H04N 1/6027* (2013.01); *H04N 1/6086* (2013.01)

(58) Field of Classification Search
CPC ...... H04N 5/217; H04N 5/2173; H04N 5/357; H04N 5/3572; H04N 5/3655; H04N 5/2176; H04N 5/2178; H04N 5/361; H04N 1/60; H04N 1/58; H04N 5/23229; H04N 5/359; H04N 5/2354; H04N 1/407; H04N 1/6077; H04N 9/735; H04N 1/6086; H04N 1/608; H04N 13/0025; H01L 27/14623; G01J 2001/444; G03B 15/05; G03B 9/70; G09G 2320/0666
USPC ...................................................... 348/223.1
See application file for complete search history.

(56) References Cited

U.S. PATENT DOCUMENTS

| | | | |
|---|---|---|---|
| 6,791,606 B1 * | 9/2004 | Miyano | H04N 9/735 348/223.1 |
| 8,049,789 B2 | 11/2011 | Innocent et al. | |
| 8,896,744 B2 | 11/2014 | Ueno et al. | |
| 2005/0270383 A1 | 12/2005 | Hung et al. | |
| 2006/0170789 A1 * | 8/2006 | Takahashi | H04N 9/735 348/223.1 |
| 2008/0246950 A1 | 10/2008 | Ono | |
| 2009/0002545 A1 * | 1/2009 | Heinonen | H04N 5/2253 348/370 |

(Continued)

FOREIGN PATENT DOCUMENTS

| | | |
|---|---|---|
| DE | 19833742 A1 | 2/1999 |
| JP | 2003-163944 A | 6/2003 |

OTHER PUBLICATIONS

International Search Report and Written Opinion received for PCT Patent Application No. PCT/US2016/056560, mailed on Dec. 19, 2016, 13 pages.

*Primary Examiner* — Nhan T Tran
(74) *Attorney, Agent, or Firm* — Brake Hughes Bellermann LLP

(57) ABSTRACT

According to an aspect, a device includes a camera configured to obtain an image, an electromagnetic radiation sensor configured to produce at least one of ultra-violet (UV) light data and infrared (IR) light data associated with the image, a sensor processor configured to detect an illuminant type probability from probability data using at least one of the UV light data and the IR light data, where the illuminant type probability indicates a level of confidence that a light source associated with the image is a particular illuminant type, and an auto-white balance unit configured to adjust auto-white balance with the illuminant type probability.

19 Claims, 12 Drawing Sheets

(56) References Cited

U.S. PATENT DOCUMENTS

| | | | |
|---|---|---|---|
| 2012/0200734 A1* | 8/2012 | Tang | H04N 5/23245 348/223.1 |
| 2012/0313908 A1* | 12/2012 | Broga | G06F 1/1684 345/207 |
| 2013/0083216 A1* | 4/2013 | Jiang | H04N 9/735 348/223.1 |
| 2013/0188057 A1 | 7/2013 | Lin et al. | |
| 2015/0054980 A1 | 2/2015 | Ahonen et al. | |
| 2015/0264329 A1* | 9/2015 | Takanashi | H04N 9/735 348/223.1 |
| 2015/0350620 A1* | 12/2015 | Kuchiki | H04N 9/735 348/223.1 |
| 2016/0007001 A1* | 1/2016 | Kuchiki | H04N 9/735 348/223.1 |
| 2016/0165202 A1* | 6/2016 | Lee | H04N 5/2258 348/164 |
| 2016/0259099 A1* | 9/2016 | Cui | G02B 5/204 |

\* cited by examiner

AUTO WHITE BALANCE USING INFRARED AND/OR ULTRAVIOLET SIGNALS

BACKGROUND

Auto White Balance (AWB) is a function that can be used to achieve color constancy under various illuminants for images captured by a camera sensor. Conventionally, AWB may collect statistical samples from the input image and estimate the illuminant by analyzing the statistical samples. However, this approach may be misled by the colors in the input image. For instance, the camera may detect a scene with only Red Green Blue (RGB) colors, but may not be able to determine the spectral distribution of the illuminant. As a result, by using only the image itself, AWB can be misled by the detected RGB values. For example, skin or wood colors tend to mislead AWB by estimating toward the lower color temperature direction and the resulting image may look incorrect (e.g., bluish instead of white).

SUMMARY

The details of one or more implementations are set forth in the accompanying drawings and the description below. Other features will be apparent from the description and drawings, and from the claims.

According to an aspect, a device includes a camera configured to obtain an image, an electromagnetic radiation sensor configured to produce at least one of ultra-violet (UV) light data and infrared (IR) light data associated with the image, a sensor processor configured to detect an illuminant type probability from probability data using at least one of the UV light data and the IR light data, where the illuminant type probability indicates a level of confidence that a light source associated with the image is a particular illuminant type, and an auto-white balance unit configured to adjust auto-white balance with the illuminant type probability.

The device may include one or more of the following features (or any combination thereof). The sensor processor may be configured to detect the illuminant type probability as being above a confidence threshold based on whether or not the UV light data is within a range of UV values and whether or not the IR light data is within a range of IR values, where the illuminant type probability is above the confidence threshold indicates that the light source can be classified as the particular illuminant type. The sensor processor may be configured to determine that the light source associated with the image is daylight when the illuminant type probability is above a confidence threshold, where the illuminant type probability is above the confidence threshold when the UV light data is above a first upper threshold and the IR light data is above a second upper threshold. The sensor processor may be configured to determine that the light source associated with the image is fluorescent light when the illuminant type probability is above a confidence threshold, where the illuminant type probability is above the confidence threshold when the UV light data is between an upper middle threshold and a lower middle threshold and the IR light data is below a lower threshold. The sensor processor may be configured to determine that the light source associated with the image is incandescent light when the illuminant type probability is above a confidence threshold, where the illuminant type probability is above the confidence threshold when the UV light data is between an upper middle threshold and a lower middle threshold and the IR light data is above an upper threshold. The sensor processor may be configured to determine that the light source associated with the image is visible light emitting diode (LED) when the illuminant type probability is above a confidence threshold, where the illuminant type probability is above the confidence threshold when the UV light data is below a first lower threshold and the IR light data is below a second lower threshold. The probability data may include at least one of a UV probability relationship and an IR probability relationship. The UV probability relationship may provide an arrangement of UV values in relation to luminance values. The UV probability relationship may include probabilities for combinations of the UV values and the luminance values. The IR probability relationship may provide an arrangement of IR values in relation to the luminance values. The IR probability relationship may indicate probabilities for combinations of the IR values and the luminance values. The probability data may include a ratio probability relationship providing probabilities for ratio values of a ratio of the UV light data and the IR light data. The camera and the electromagnetic radiation sensor may share an interface bus and a power connection. The camera may be a front camera disposed on a same side of a display screen of the device.

According to an aspect, a non-transitory computer-readable medium storing executable instructions that when executed cause at least one processor to capture an image, produce ultra-violet (UV) light data and infrared (IR) light data associated with the image, determine whether a luminance associated with the image is above a threshold, detect an illuminant type probability from probability data using the UV light data and the IR light data according to a first method when the luminance is above the threshold, where the illuminant type probability indicates a level of confidence that a light source associated with the image is a particular illuminant type, detect the illuminant type probability from the probability data using the UV light data and the IR light data according to a second method when the luminance is below the threshold, where the second method is different than the first method, and adjust auto-white balance with the illuminant type probability according to the first method or the second method.

The non-transitory computer-readable medium may include one or more of the above or below features (or any combination thereof). The probability data may include a UV probability relationship and an IR probability relationship, and the first method includes executable instructions that when executed cause the at least one processor to determine an absolute value of the UV light data and an absolute value of the IR light data, obtain a UV probability from the UV probability relationship based on the absolute value of the UV light data, obtain an IR probability from the IR probability relationship based on the absolute value of the IR light data, and compute the illuminant type probability based on the UV probability and the IR probability. The probability data may include a ratio probability relationship, and the second method includes executable instructions that when executed cause the at least one processor to compute a ratio of a value of the UV light data and a value of the IR light data, and obtain the illuminant type probability from the ratio probability relationship using the ratio. The illuminant type probability may be detected as being above a confidence threshold based on whether or not the UV light data is within a range of UV values and whether or not the IR light data is within a range of IR values, where the illuminant type probability being above the confidence threshold indicates that the light source can be classified as the particular illuminant type. The executable instructions to adjust the auto-white balance include executable instructions that when executed cause the at least one processor to incorporate the illuminant type probability from the probability data in advance of an initial decision on an amount of AWB gain including weighing AWB statistical samples of the image with the illuminant type probability from the probability data. The executable instructions to adjust the auto-white balance include executable instructions that when executed cause the at least one processor to incorporate the illuminant type probability from the probability data as part of decision modification heuristics and temporal heuristics.

According to an aspect, a method includes obtaining, by a camera, an image, producing, by an electromagnetic radiation sensor, ultra-violet (UV) light data and infrared (IR) light data associated with the image, detecting, by an sensor processor, an illuminant type probability from probability data using the UV light data and the IR light data according to either a first method or a second method, the illuminant type probability indicating a level of confidence that a light source associated with the image is a particular illuminant type, and adjusting, by an auto-white balance unit, auto-white balance with the illuminant type probability.

The method may include one or more of the following above or below features (or any combination thereof). The probability data may include a UV probability relationship and an IR probability relationship, and the first method includes obtaining a UV probability from the UV probability relationship using an absolute value of the UV light data and a luminance value associated with the image, obtaining an IR probability from the IR probability relationship based on an absolute value of the IR light data and the luminance value associated with the image, and computing the illuminant type probability by multiplying the UV probability with the IR probability. The probability data may include a ratio probability relationship, and the second method includes computing a ratio of a value of the UV light data and a value of the IR light data, and determining the particular illuminant type of the light source and the illuminant type probability of the particular illuminant type from the ratio probability relationship using the ratio. Adjusting the auto-white balance with the illuminant type probability may include parsing AWB statistical samples of the image, weighting the AWB statistical samples with the illuminant type probability from the probability data, determining, as an initial decision, an amount of AWB gain based on the weighted AWB statistical samples, and performing heuristics on the AWB statistical samples and the amount of AWB gain determined as part of the initial decision, the illuminant type probability from the probability data also being incorporated into the heuristics.

DETAILED DESCRIPTION

According to an aspect, the implementations discussed herein may provide an enhanced auto-white balance (AWB) mechanism in which AWB is enhanced with Infrared (IR) and/or Ultraviolet (UV) light data. For example, instead of using only the Red Green Blue (RGB) values from the image itself to estimate the illuminant, the enhanced AWB mechanism may use the IR and/or UV light data to provide additional information about the scene of the image, which may assist with making a correct decision regarding the appropriate white balance for the image. The UV and/or IR light data may provide information on the type of illuminant associated with the image such as whether it contains real daylight, incandescent light, fluorescent light, and/or visible light emitting diode (LED).

Figure 1A:
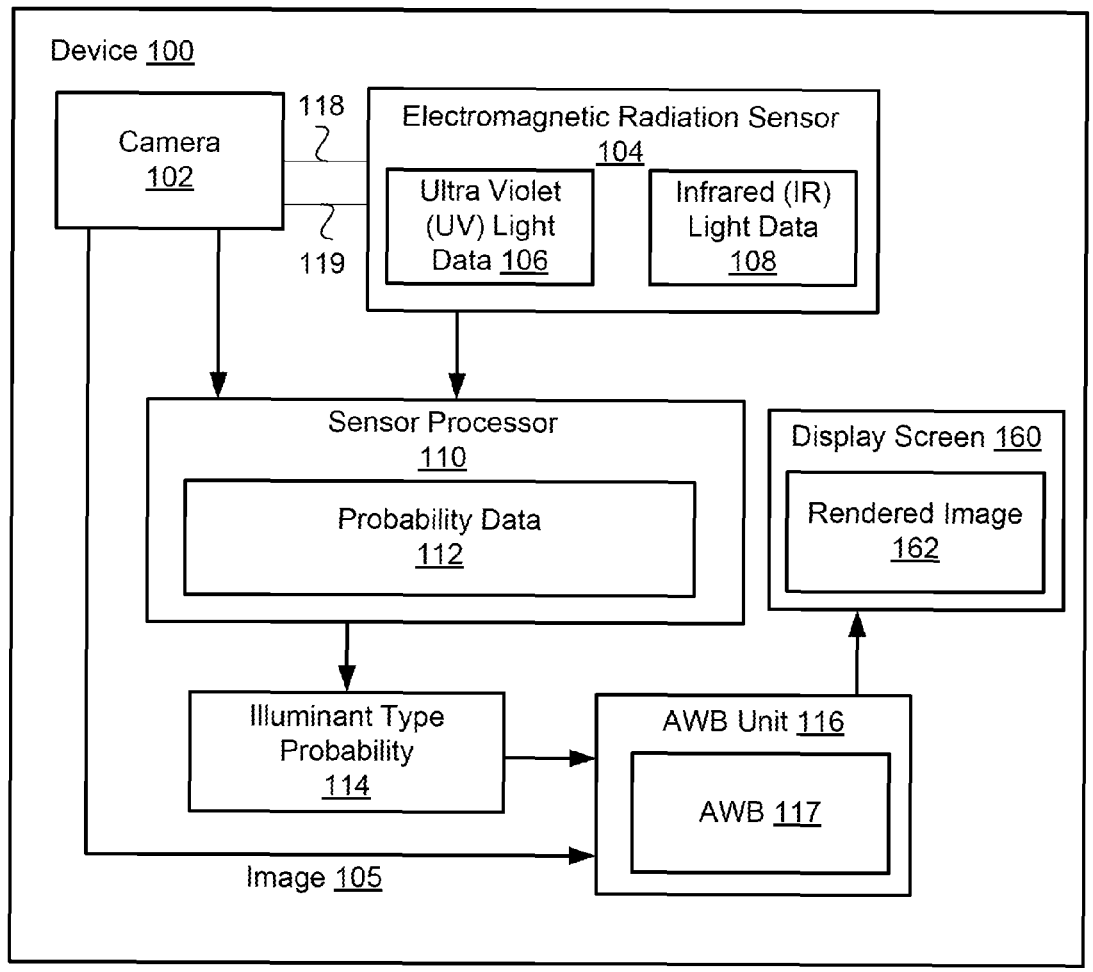
FIG. 1A illustrates a block diagram of a device configured to enhance auto-white balance (AWB) with ultra violet (UV) light data and/or Infrared (IR) light data according to an aspect.

FIG. 1A illustrates a block diagram of a device 100 configured to enhance auto-white balance (AWB) with ultra violet (UV) light data 106 and/or Infrared (IR) light data 108 according to an aspect. For instance, instead of using only the RGB values of an image 105 for AWB, the device 100 incorporates the UV light data 106 and/or the IR light data 108 into the analysis to determine the type of illuminant associated with the image 105. For example, the device 100 may determine the illuminant type of the image's light source (e.g., whether it is real daylight, incandescent light, fluorescent light, and/or visible LED light) and/or the probability that the image's light source is a particular type of illuminant based on the UV light data 106 and/or the IR light data 108.

The device 100 may include any type of device having image capturing capabilities. In some examples, the device 100 is a computing device such as a mobile computing device (e.g., a laptop, smartphone, tablet, etc.), or a non-mobile computing device (e.g., desktop computer). In some examples, the device 100 is stand-alone camera device (e.g., the primary purpose of the device 100 is capturing images 105).

The device 100 may include a camera 102 configured to capture an image 105. The camera 102 may be a digital camera. In some examples, the camera 102 may be disposed on a front surface of the device 100 (e.g., front-facing camera). For example, the camera 102 may be disposed on the same side as a display screen 160 of the device 100. In some examples, the camera 102 may be disposed on a backside surface of the device 100 (e.g., back-facing camera disposed on the opposite side of the display screen 160). In some examples, the device 100 may include multiple cameras 102 (e.g., both the front-facing camera and the back-facing camera).

The image 105 may be an individual still image (e.g., photograph) or a sequence of images constituting a video or movie. The image 105 may be a digital image. The image 105 may be a numeric representation of a two-dimensional image having digital values called picture elements or pixels, where each pixel has a luminance value indicating a level of brightness. The image 105 may include a fixed number of rows and columns of pixels, where the pixels are the smallest individual element in an image, holding quantized values that represent the brightness of a given color at any specific point. In some examples, the image 105 include red green blue (RGB) luminance values, where each pixel is represented by an RGB luminance value which indicates its red, green, and blue intensity.

The device 100 may include an electromagnetic radiation sensor 104 configured to detect an amount of ultraviolet (UV) light and/or infrared (IR) light associated with the image 105 and process or represent the detected amounts as UV light data 106 and/or IR light data 108. In some examples, the electromagnetic radiation sensor 104 may produce both the UV light data 106 and the IR light data 108. In some examples, the electromagnetic radiation sensor 104 is a single sensor component capable of sensing both UV light and IR light. In other examples, the electromagnetic radiation sensor 104 may include separate sensor components such as a UV sensor configured to generate the UV light data 106 and an IR sensor configured to generate the IR light data 108. In some examples, the electromagnetic radiation sensor 104 may produce only the UV light data 106. In some examples, the electromagnetic radiation sensor 104 may produce only the IR light data 108. The UV light data 106 may include a UV value that represents a level of UV light associated with the image 105 (or a portion of the image 105). In some examples, the UV light data 106 include multiple UV readings such a first UV value captured at a first time and a second UV value captured at a second time subsequent to the first time. The IR light data 108 may include an IR value that represents a level of IR light associated with the image 105 (or a portion of the image 105). In some examples, the IR light data 108 may include multiple IR readings such as a first IR value captured at a first time and a second IR value captured at a second time subsequent to the first time.

The electromagnetic radiation sensor 104 may detect the amount of UV light and/or IR light from a field of view of the electromagnetic radiation sensor 104. The electromagnetic radiation sensor 104 may produce the UV light data 106 by measuring the amount of UV rays, and may produce the IR light data 108 by measuring the amount of IR rays. The electromagnetic radiation sensor 104 may detect the amount of UV light and/or IR light from a physical area that is close to the device 100 (e.g., within a certain range from the device 100). In some examples, the electromagnetic radiation sensor 104 may detect the amount of UV light and/or IR light from a location (or partial location) of the scene of the captured image 105. For example, the electromagnetic radiation sensor 104 may be directed to sense the UV light and/or IR light from an area that generally corresponds to the field of view of the camera 102.

The electromagnetic radiation sensor 104 may include an arrangement of one or more photodiodes, amplifiers, and/or analog and digital circuits. The electromagnetic radiation sensor 104 may be disposed proximate to the camera 102. In some examples, the electromagnetic radiation sensor 104 may be coupled to the camera 102. In some examples, the electromagnetic radiation sensor 104 and the camera 102 may share a power connection 118 and a computer bus 119. In some examples, the computer bus 119 is an Inter-Integrated Circuit (I2C) bus. In some examples, the device 100 may include multiple cameras 102, wherein only one of the cameras 102 shares a common power connection 118 and computer bus 119 with the electromagnetic radiation sensor 104. In some examples, the camera 102 configured as the front-facing camera shares the common power connection 118 and the computer bus 119 with the electromagnetic radiation sensor 104. In some examples, the camera 102 configured as the back-facing camera shares the common power connection 118 and the computer bus 119 with the electromagnetic radiation sensor 104. In some examples, the electromagnetic radiation sensor 104 is integrated into the camera 102. For instance, the camera 102 is also capable of sensing UV and IR light, and representing the detected amounts as UV light data 106 and IR light data 108.

The device 100 may include a sensor processor 110 configured to detect an illuminant type probability 114 of a light source associated with the image 105 from probability data 112 using the UV light data 106 and the IR light data 108. The probability data 112 may specify the probabilities for each illuminant type for various combinations of UV and IR values. In some examples, the probability data 112 may specify the probabilities for each illuminant type for various combinations of UR and IR values and luminance values associated with the image 105. The illuminant type probability 114 may refer to (or represent) the level of confidence of the image's light source is a certain illuminant type such as daylight, fluorescent light, incandescent light, and/or visible LED light. Also, the illuminant type may include other classifications of light sources. In other words, an illuminant may refer to a light source, and the illuminant type may refer to the type of light source. In some example, the image 105 may include multiple light sources, and the sensor processor 110 may detect the illuminant type probability 114 for each light source present in the image 105.

The illuminant type probability 114 may be a numeric value of a scale that indicates the level of confidence of the light source is a particular illuminant type. In some examples, one end of the scale may indicate a low probability (e.g., 0 percent probability) and the other end of the scale may indicate a high probability (e.g., 90 or 100 percent probability). In a non-limiting example, the illuminant type probability 114 may be a value in the range of 0-100. However, it is noted that any type of numeric scale may be used. When the illuminant type probability 114 is above a confidence threshold (e.g., above 80), the sensor processor 110 may classify the light source as a particular type of illuminant. In some examples, the illuminant type probability 114 may include one or more of the following: the probability of the light source being a first illuminant type (e.g., daylight), the probability of the light source being a second illuminant type (e.g., fluorescent light), the probability of the light source being a third illuminant type (e.g., incandescent light), the probability of the light source being a third illuminant type (e.g., visible LED light). In some examples, there is a high threshold and a low threshold for UV and/or IR values with respect to a particular illuminant type. When the UV value and/or the IR value is/are higher than the high threshold, the sensor processor 110 may determine a 100% probability that the light source is the particular illuminant type, and when the UV value and/or the IR value is/are lower than the low threshold, the sensor processor 110 may determine a 0% probability that the light source is the particular illuminant type. For UV and/or IR values in between the low threshold and the high threshold, the sensor processor 110 may interpolate the probability linearly.

The device 100 may include an auto-white balance (AWB) unit 116 configured to receive the image 105 and the illuminant type probability 114, and adjust AWB 117 applied to the image 105 with the illuminant type probability 114. The incorporation of the illuminant type probability 114 into the application of the AWB 117 may increase the quality of the image 105, thereby provided as a rendered image 162 on the display screen 160. In some example, AWB 117 may be a process of removing unrealistic color casts, so that objects which appear white in reality are rendered white in a captured image. AWB 117 may incorporate the color temperature of a light source, which refers to the relative warmth or coolness of white light. Human eyes are good at judging what is white under different light sources, but cameras often have difficulty with AWB 117, and can create unsightly blue, orange, or even green color casts in the rendered image 162. In some examples, a conventional camera cannot obtain (or estimate or accurately estimate) the spectral distribution of an illuminant, and therefore the AWB 117 can be misled by the detected RGB values of the image 105.

The AWB unit 116 may collect AWB statistical samples from the captured image 105 and weight the collected AWB statistical samples using the illuminant type probability 114. As a result, the AWB unit 116 may adjust the image 105 with the proper white balance such that objects that appear white in reality are rendered white in the rendered image 162 and/or color consistency is achieved (e.g., a purple collar on a shirt stays purple in the rendered image 162 instead of being rendered as blue using conventional AWB, a cabinet stays grey in the rendered image 162 instead of being rendered as blue using conventional AWB, etc.). Conventional AWB techniques may estimate the illuminant type using the AWB statistical samples, which are sampled from the image 105 itself.

Figure 8:
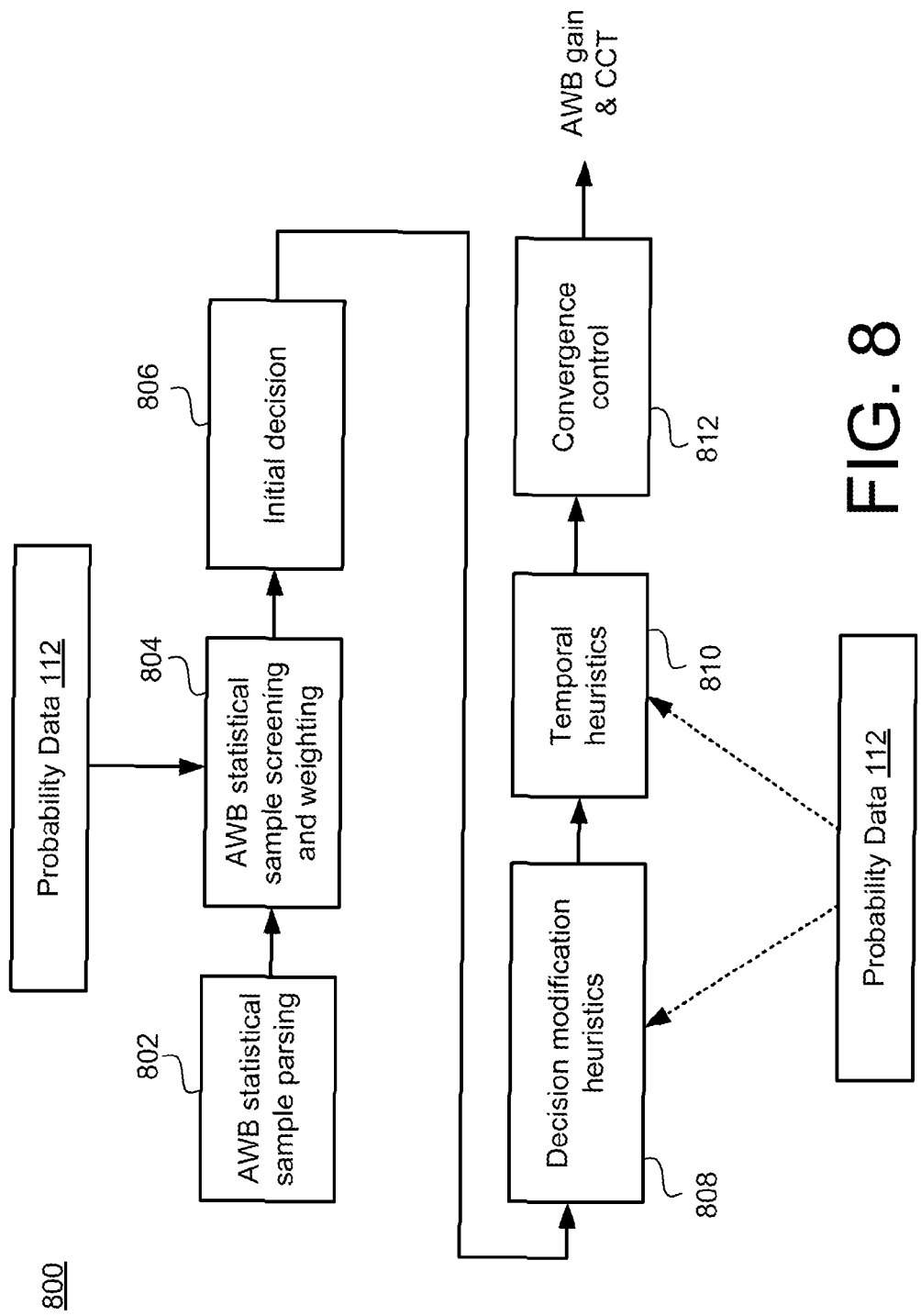
FIG. 8 is a flowchart illustrating example operations of an AWB unit of FIG. 1A according to an aspect.

However, according to various aspects, the AWB unit 116 may incorporate the illuminant type probability 114 into the AWB 117, where the illuminant type probability 114 provides the likelihood of whether the scene's light source(s) is a particular type of illuminant (which has been derived from the UV light data 106 and/or the IR light data 108). As a result, the AWB unit 116 may not have to estimate the illuminant type using only the AWB statistical samples. In other examples, the AWB unit 116 may enhance the illuminant type estimation from the AWB statistical samples with the illuminant type probability 114 determined by the sensor processor 110. FIG. 8 illustrates the AWB 117 in further detail, which is explained later in the disclosure.

The UV light data 106 and the IR light data 108 may provide additional information about the illuminant associated with the image 105, which is not available from the RGB values of the image 105. For instance, the values of the UV light data 106 and the IR light data 108 may determine the illuminant type probability 114. In some examples, the sensor processor 110 may detect the illuminant type probability 114 as being above the confidence threshold based on whether or not the UV light data 106 is within a range of UV values and whether or not the IR light data 108 is within a range of IR values, where the illuminant type probability 114 being above the confidence threshold indicates that the light source can be classified as the particular illuminant type.

Figure 1B:
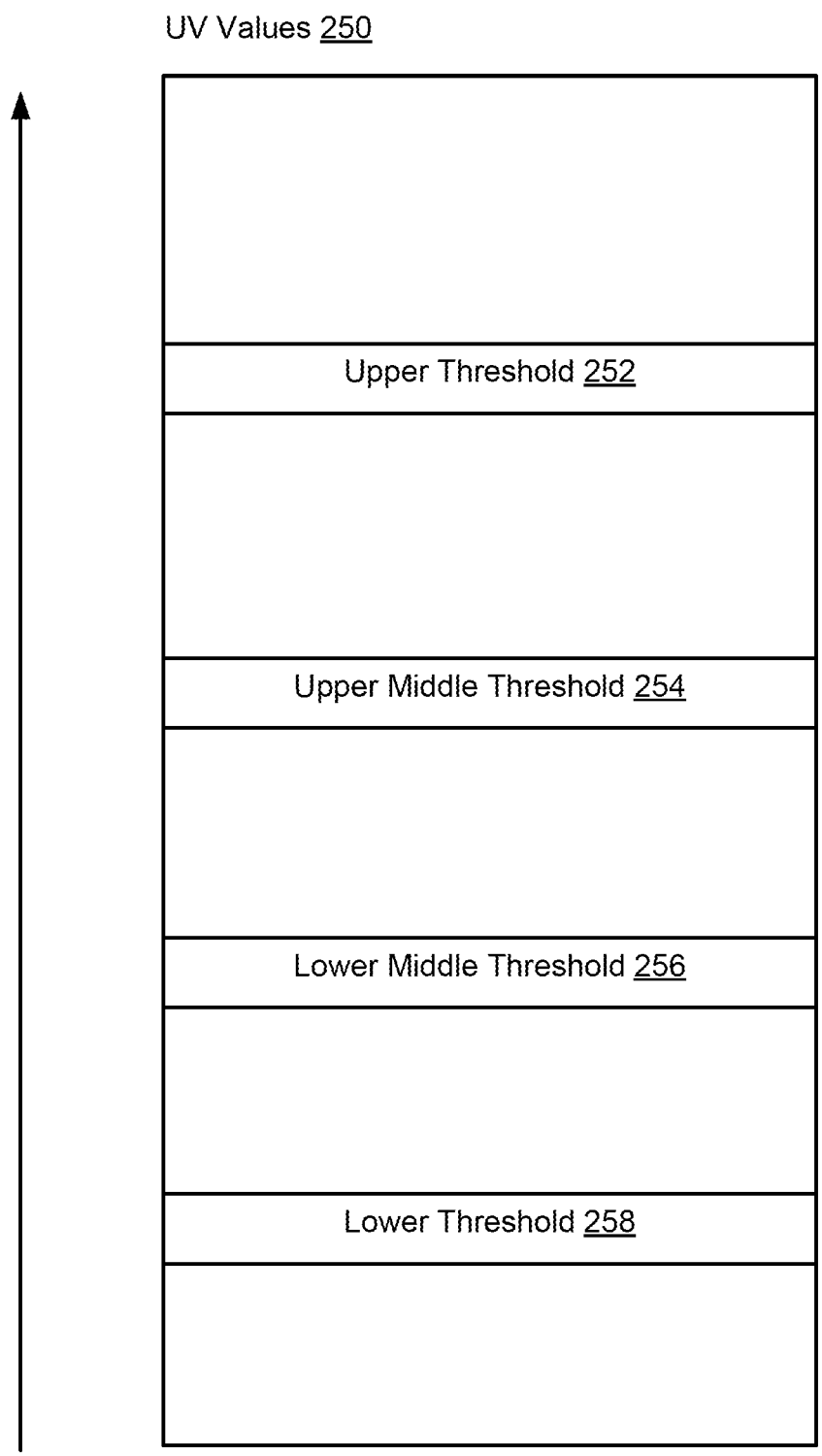
FIG. 1B illustrates UV values with a plurality of thresholds according to an aspect.
Figure 1C:
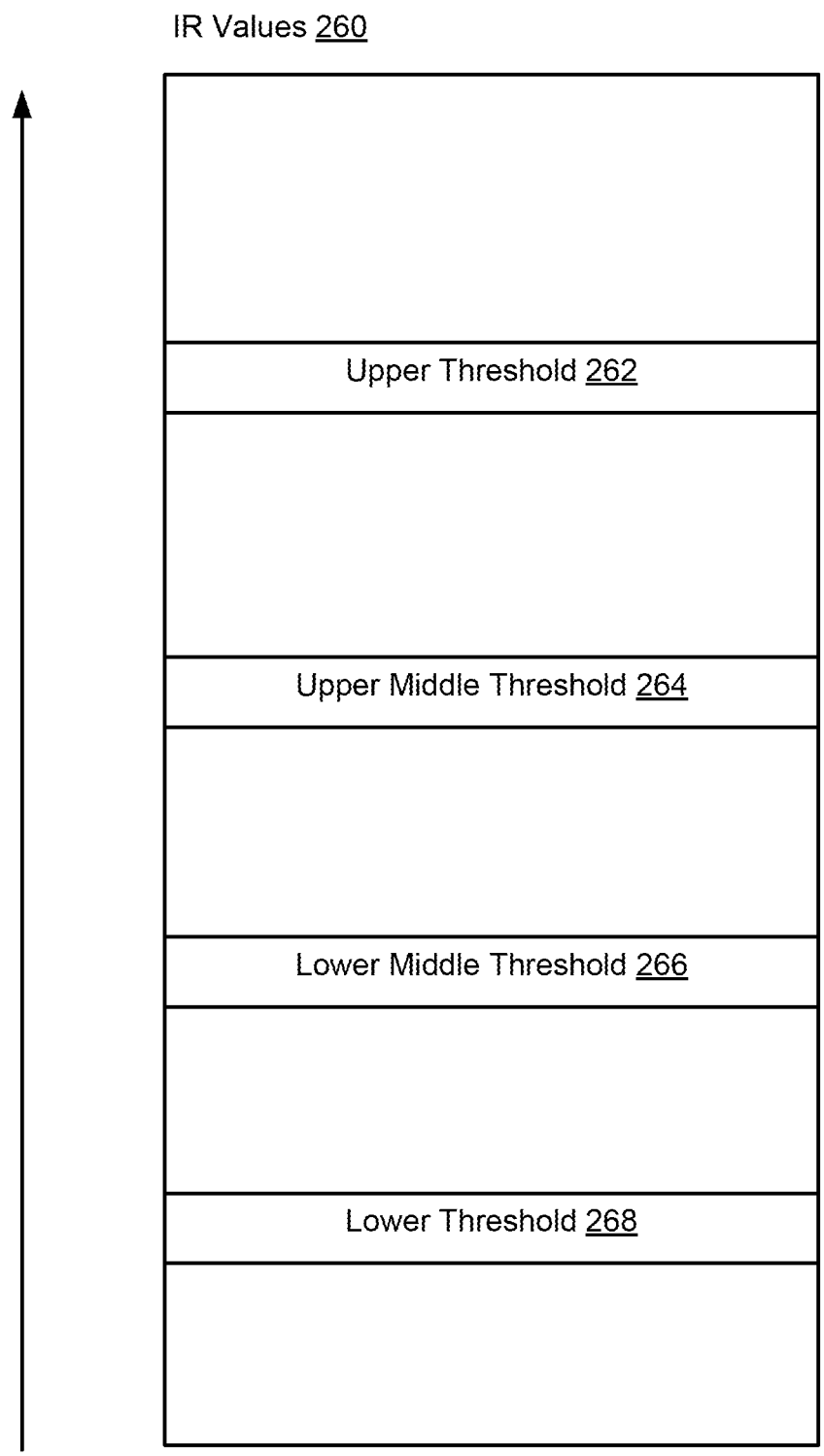
FIG. 1C illustrates IR values with a plurality of thresholds according to an aspect.

FIG. 1B illustrates UV values 250 with a plurality of thresholds according to an aspect. FIG. 1C illustrates IR values 260 with a plurality of thresholds according to an aspect. The UV values 250 may represent the spectrum of values (or a portion of the spectrum) of UV radiation. The IR values 260 may represent the spectrum of values (or a portion of the spectrum) of IR radiation. The probability data 112 may provide the illuminant type probability 114 for various combinations of the UV values 250 and the IR values 260. When the UV light data 106 falls within a certain range of the UV values 250 and the IR light data 108 falls within a certain range of the IR values 260, the sensor processor 110 may determine that the light source associated with the image 105 is a particular illuminant type and/or the probability that image's light source is the particular illuminant type.

In particular, the sensor processor 110 may determine that the light source associated with the image 105 is daylight when the illuminant type probability 114 is above a confidence threshold, and the illuminant type probability 114 is above the confidence threshold when the UV light data 106 is above an upper threshold 252 and the IR light data 108 is above an upper threshold 262. For example, a relatively high value for the UV light data 106 (e.g., a UV value above the upper threshold 252) and a relatively high value for the IR light data 108 (e.g., an IR value above the upper threshold 262) may indicate that the illuminant type is daylight.

The sensor processor 110 may determine that the light source associated with the image 105 is fluorescent light when the illuminant type probability 114 is above a confidence threshold, where the illuminant type probability 114 above the confidence threshold when the UV light data 106 is between an upper middle threshold 254 and a lower middle threshold 256, and the IR light data 108 is below a lower threshold 268. For instance, a medium value for the UV light data 106 (e.g., a UV value between the upper middle threshold 254 and the lower middle threshold 256) and a relatively low value for the IR light data 108 (e.g., an IR value below the lower threshold 268) may indicate that the illuminant type is fluorescent light.

The sensor processor 110 may determine that the light source associated with the image 105 is incandescent light when the illuminant type probability 114 is above a confidence threshold, where the illuminant type probability 114 is above the confidence threshold when the UV light data 106 is between the upper middle threshold 254 and the lower middle threshold 256 and the IR light data 108 is above the upper threshold 262. For instance, a medium value for the UV light data 106 (e.g., a UV value between the upper middle threshold 254 and the lower middle threshold 256) and a relatively high value for the IR light data 108 (e.g., an IR value above the upper threshold 262) may indicate that the illuminant type is incandescent light).

The sensor processor 110 may determine that the light source associated with the image 105 is visible LED when the illuminant type probability is above the confidence threshold, where the illuminant type probability 114 is above the confidence threshold when the UV light data 106 is below a lower threshold 258 and the IR light data 108 is below the lower threshold 268. For instance, a relatively low value for the UV light data 106 (e.g., a UV value below the lower threshold 258) and a relatively low value for the IR light data 108 (e.g., an IR value below the lower threshold 268) may indicate that the illuminant type is visible LED. In some examples, the probability data 112 may specify upper middle threshold 264 and lower middle threshold 266 that are used to differentiate other types of illuminants. In some examples, the lower threshold 258 and the lower threshold 268 may be 10-20. However, the thresholds discussed with reference to FIGS. 1B and 1C may be selected based on the type of IR/UV sensor used.

Figure 2:
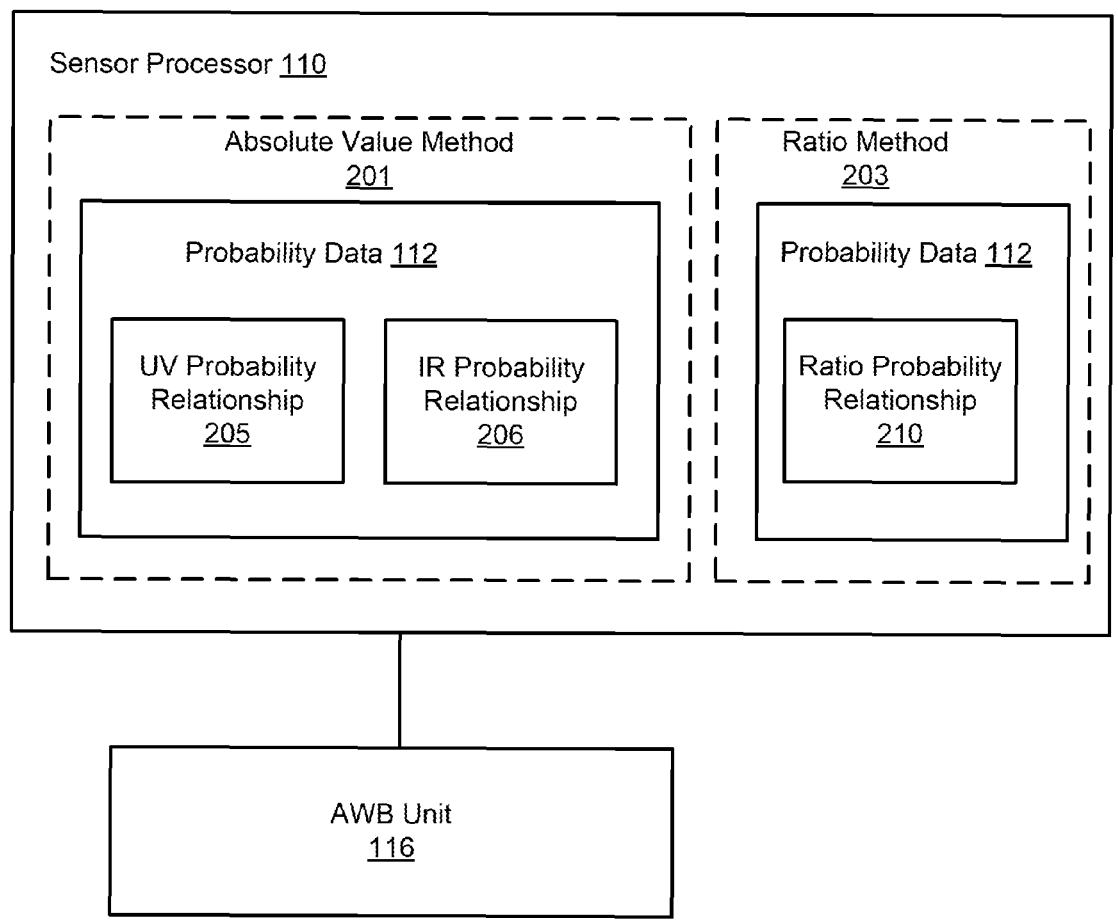
FIG. 2 illustrates an example of a sensor processor of the device of FIG. 1A according to an aspect.

FIG. 2 illustrates an example of the sensor processor 110 according to an aspect. In some examples, the sensor processor 110 may detect the illuminant type probability 114 according to an absolute value method 201 (e.g., a first method) and/or a ratio method 203 (e.g., second method). In some examples, the sensor processor 110 may determine the illuminant type probability 114 using only the absolute value method 201. In some examples, the sensor processor 110 may determine the illuminant type probability 114 using only the ratio method 203. In some examples, the sensor processor 110 may determine the illuminant type probability 114 based on a combination of the absolute value method 201 and the ratio method 203.

In some examples, the sensor processor 110 may determine which one of the absolute value method 201 and the ratio method 203 to use to determine the illuminant type probability 114 based on a level of luminance of the image 105. For example, the sensor processor 110 may determine the luminance of the image 105, and when the luminance is above a threshold value, the sensor processor 110 may determine to use the ratio method 203. In some examples, the threshold may be 50 lux. However, in some examples, the threshold may be selected based on the type of UV/IR sensor. In other examples, when the luminance is below the threshold value, the sensor processor 110 may determine to use the absolute value method 201. In some examples, the ratio method 203 may be computational faster than the absolute value method 201, but the ratio method 203 may not be as accurate as the absolute value method 201 for luminance levels below the threshold value.

According to the absolute value method 201, the probability data 112 may include a UV probability relationship 205 and an IR probability relationship 206. In some examples, the UV probability relationship 205 and the IR probability relationship 206 are implemented as separate tables (or a single table) or other type of data structure arranging the relationship among the UV values 250 and IR values 260 and UV probabilities and IR probabilities. In some examples, a pair of tables (e.g., the pair including one table for the UV probability relationship 205 and one table for the IR probability relationship 206) is provided for each illuminant type. The UV probability relationship 205 may specify UV probabilities for combinations of the UV values 250 and luminance values for each type of illuminant. The luminance values may be the spectrum of values ranging from bright to dark. As such, for a particular combination of a UV value 250 and a luminance value, the UV probability relationship 205 may provide a UV probability that indicates the probability of the light source is a particular illuminant type. The IR probability relationship 206 may specify IR probabilities for combinations of the IR values 260 and the luminance values for each type of illuminant. As such, for a particular combination of an IR value 260 and a luminance value, the IR probability relationship 206 may provide an IR probability that indicates the probability of the light source is a particular illuminant type.

The sensor processor 110 may receive the UV light data 106 and the IR light data 108 from the electromagnetic radiation sensor 104. The sensor processor 110 may obtain the absolute value of the UV light data 106, and the absolute value of the IR light data 108. Then, the sensor processor 110 may determine the UV probability from the UV probability relationship 205 using the absolute value of the UV light data 106 and the luminance value of the image 105. For example, the sensor processor 110 may obtain the UV probability that corresponds to the combination of the UV light data's absolute value and the luminance value of the image 105.

The sensor processor 110 may determine the IR probability from the IR probability relationship 206 using the absolute value of the IR light data 108 and the luminance value of the image 105. For example, the sensor processor 110 may obtain the IR probability that corresponds to the combination of the IR light data's absolute value and the luminance value of the image 105. The sensor processor 110 may compute the illuminant type probability 114 (e.g., the overall probability) based on the UV probability and the IR probability. In some examples, the sensor processor 110 may compute the illuminant type probability 114 by multiplying the UV probability and the IR probability. In some examples, the sensor processor 110 may compare the illuminant type probability 114 to the confidence threshold. If the illuminant type probability 114 is above the confidence threshold, the sensor processor 110 may determine that the light source can be classified as the particular illuminant type. If the illuminant type probability 114 is below the confidence threshold, the sensor processor 110 may determine that the light source can not be classified as the particular illuminant type.

Figure 3:
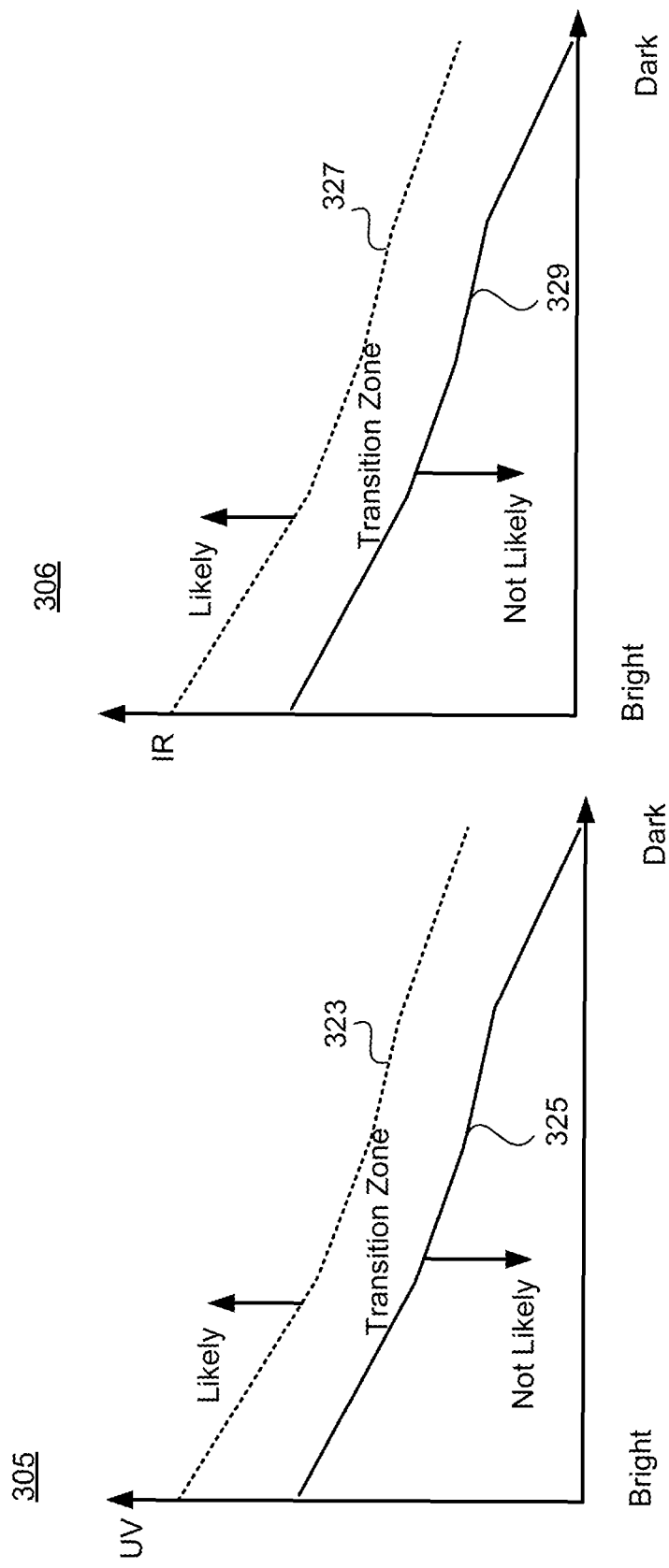
FIG. 3A illustrates a graph depicting a graphical representation of a UV probability relationship for the illuminant type of daylight according to an aspect.
FIG. 3B illustrates a graph depicting a graphical representation of an IR probability relationship for the illuminant type of daylight according to an aspect.

FIG. 3A illustrates a graph 305 depicting a graphical representation of the UV probability relationship 205 for the illuminant type of daylight according to an aspect. FIG. 3B illustrates a graph 306 depicting a graphical representation of the IR probability relationship 206 for the illuminant type of daylight according to an aspect. Similar graphs may be used to depict the UV probability relationship 205 and the IR probability relationship 206 for other illuminant types.

Referring to FIG. 3A, the x-axis provides luminance values from bright to dark, and the y-axis provides increasing UV values 250. The graph 305 includes a first curve 323 and a second curve 325, where the space between the first curve 323 and the second curve 325 may be referred to as a transition zone. For combinations of luminance values and UV values 250 that are disposed above the first curve 323, the likelihood that the light source is daylight may be considered as likely (e.g., UV probability being above the confidence threshold). Also, the UV probability may increase as a UV/luminance combination value moves further away from the first curve 323. For combinations of luminance values and UV values 250 that are disposed below the second curve 325, the likelihood that the light source is daylight may be considered as unlikely (e.g., UV probability being below the confidence threshold). Also, the UV probability may decrease as a UV/luminance combination value moves further away from the second curve 325. For combinations of luminance values and UV values 250 that are disposed between the first curve 323 and the second curve 325, the UV probability may be considered in the transition zone, where the light source may not be classified as daylight with a good confidence level.

Referring to FIG. 3B, the x-axis provides luminance values from bright to dark, and the y-axis provides increasing IR values 260. The graph 306 includes a first curve 327 and a second curve 329, where the space between the first curve 327 and the second curve 329 may be referred to as a transition zone. For combinations of luminance values and IR values 260 that are disposed above the first curve 327, the likelihood that the light source is daylight may be considered as likely (e.g., IR probability being above the confidence threshold). Also, the IR probability may increase as an IR/luminance combination value moves further away from the first curve 327. For combinations of luminance values and IR values 260 that are disposed below the second curve 329, the likelihood that the light source is daylight may be considered as unlikely (e.g., IR probability being below the confidence threshold). Also, the IR probability may decrease as an IR/luminance combination value moves further away from the second curve 329. For combinations of luminance values and IR values 260 that are disposed between the first curve 327 and the second curve 329, the IR probability may be considered in the transition zone, where the light source may not be classified as daylight with a good confidence level.

In some examples, the luminance values (along x-axis) may define a series of knee points (or distinct points) from very bright (exp_index=0) to very dark (exp_index=max). The knee points of the scene brightness can be mapped as follows: 1) exp_index=0 is 100,000 lux, 2) exp_index=outdoor is 4000 lux, 3) exp_index=in-out-door is 1000 lux, 4) exp_index=indoor is 400 lux, and 5) exp_index=max is 20 lux or lower. The threshold values for the UV and IR at each of the knee points may be defined in an array as follows: [exp_index=0, exp_index=outdoor, exp_index=in-out-door, exp_index=in, exp_index=max]. Then, this array may be populated with actual data points to produce a series of arrays as follows: 1) upper UV threshold (e.g., first curve 323)=[5000, 1000, 800, 100, 30], 2) lower UV threshold (e.g., second curve 325)=[3000, 700, 500, 10, 0], 3) upper IR threshold (e.g., first curve 327)=[1000, 150, 100, 25, 10], and 4) lower IR threshold (e.g., second curve 329)=[400, 50, 30, 10, 0]. The values in these arrays indicate the intensity of the UV or IR at the distinct knee points. For example, one point (x, y) on the first curve 323 is 100,000 lux, 5000 UV intensity. It is noted that this data has been measured with a type of sensor at 200 ms exposure time. Changing the sensor or the exposure time may dramatically change the values.

According to the ratio method 203, the probability data 112 may include a ratio probability relationship 210 providing probabilities for the illuminant type probability 114 for each type of illuminant for ratio values of a ratio of the UV light data 106 and the IR light data 108. In some examples, the ratio probability relationship 210 is a table that provides a range of probabilities for the illuminant type probability 114 for each type of illuminant in relation to a range of ratio values. In some examples, the table is a single table. In some examples, the sensor processor 110 may compute the ratio of the value of the UV light data 106 and the value of the IR light data 108, and obtain the illuminant type probability 114 from the ratio probability relationship 210 using the ratio.

Figure 4:
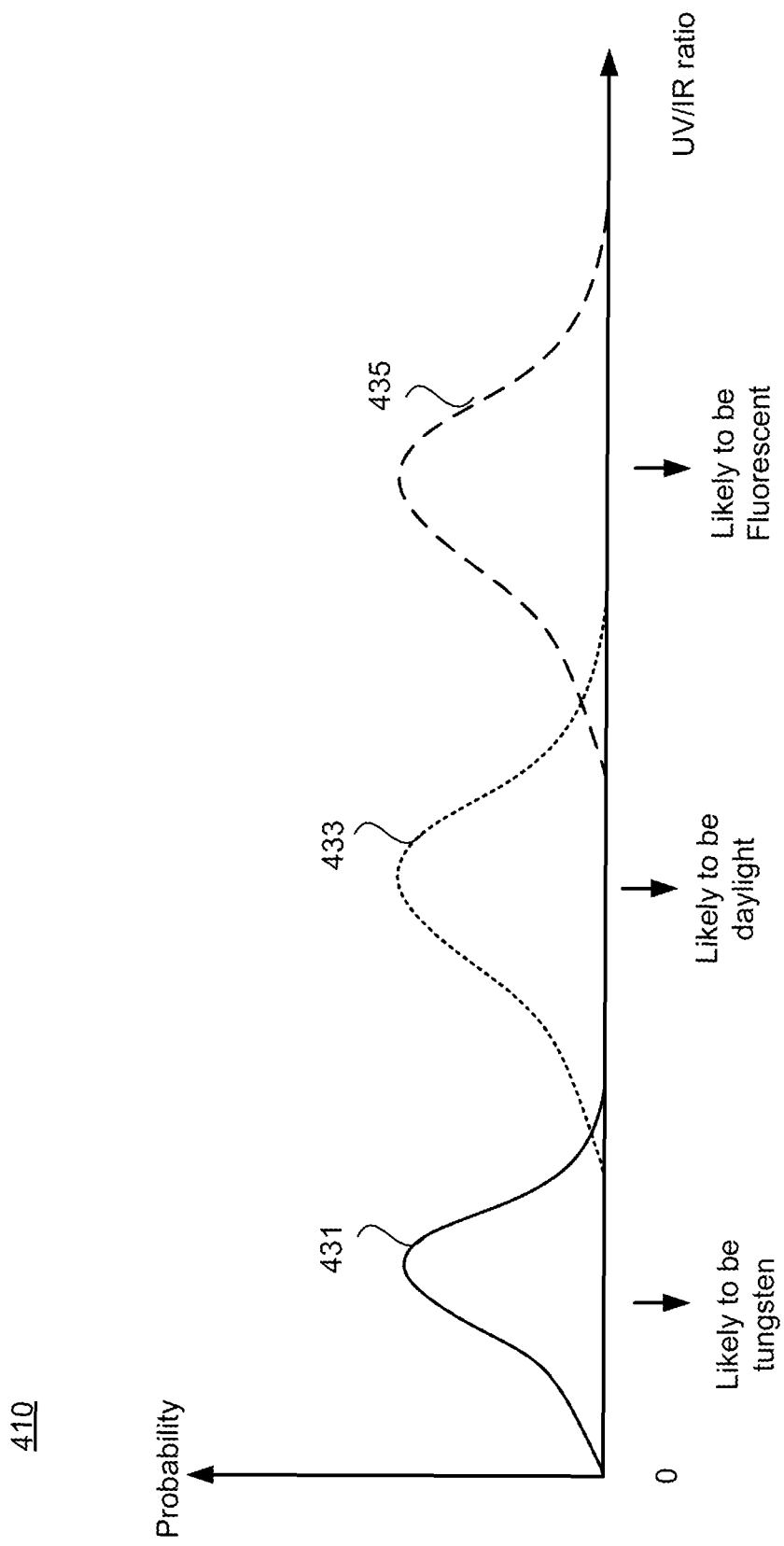
FIG. 4 illustrates a graph depicting a graphical representation of a ratio probability relationship according to an aspect.

FIG. 4 illustrates a graph 410 depicting a graphical representation of the ratio probability relationship 210 according to an aspect. In some examples, each illuminant type may have a distinct range of the UV/IR ratios. The graph 410 may include a first zone 431 of a first illuminant type (e.g., tungsten), a second zone 433 of a second illuminant type (e.g., daylight), and a third zone 435 of a third illuminant type (e.g., fluorescent). When the UV/IR ratio falls within the first zone 431, the light source may be determined as the first illuminant type. When the UV/IR ratio falls within the second zone 433, the light source may be determined as the second illuminant type. When the UV/IR ratio falls within the third zone 435, the light source may be determined as the third illuminant type. In some examples, the UV/IR ratio for daylight is centered at 20, the UV/IR ratio for fluorescent is centered at 50, the UV/IR ratio for LED is centered at 30, and the UV/IR ratio for Tungsten is centered at 5. However, these values may widely range depending on the implementation.

Figure 5:
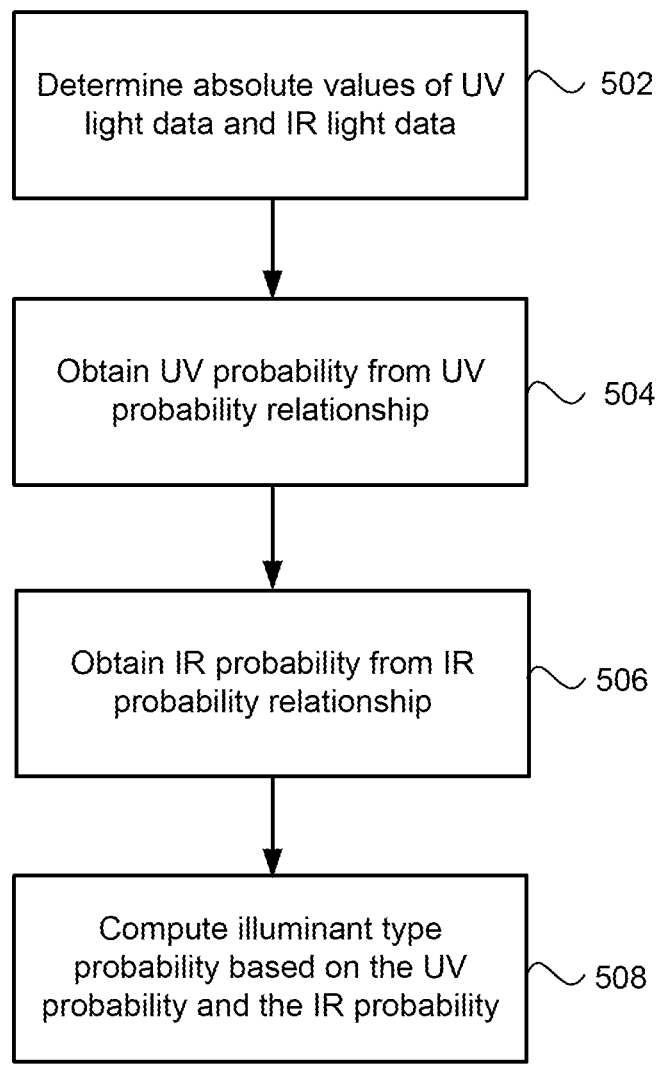
FIG. 5 is a flowchart illustrating example operations of an absolute value method according to an aspect.

FIG. 5 is a flowchart 500 illustrating example operations of the absolute value method 201 according to an aspect. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

Absolute values of the UV light data and the IR light data may be determined (502). For example, the sensor processor 110 may receive the UV light data 106 and the IR light data 108 from the electromagnetic radiation sensor 104. The sensor processor 110 may obtain the absolute value of the UV light data 106, and the absolute value of the IR light data 108.

A UV probability may be obtained from a UV probability relationship (504). For example, the sensor processor 110 may determine the UV probability from the UV probability relationship 205 using the absolute value of the UV light data 106 and the luminance value of the image 105. For example, the sensor processor 110 may obtain the UV probability that corresponds to the combination of the UV light data's absolute value and the luminance value of the image 105.

An IR probability may be obtained from IR probability relationship (506). For example, the sensor processor 110 may determine the IR probability from the IR probability relationship 206 using the absolute value of the IR light data 108 and the luminance value of the image 105. The sensor processor 110 may obtain the IR probability that corresponds to the combination of the IR light data's absolute value and the luminance value of the image 105.

An illuminant type probability may be computed based on the UV probability and the IR probability (508). For example, the sensor processor 110 may compute the illuminant type probability 114 (e.g., the overall probability) based on the UV probability and the IR probability. In some examples, the sensor processor 110 may compute the illuminant type probability 114 by multiplying the UV probability and the IR probability. In some examples, the sensor processor 110 may compare the illuminant type probability 114 to the confidence threshold. If the illuminant type probability 114 is above the confidence threshold, the sensor processor 110 may determine that the light source can be classified as the particular illuminant type. If the illuminant type probability 114 is below the confidence threshold, the sensor processor 110 may determine that the light source can not be classified as the particular illuminant type.

Figure 6:
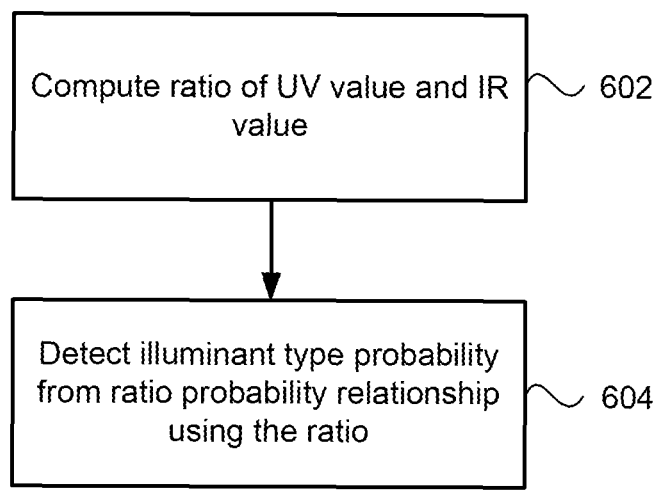
FIG. 6 is a flowchart illustrating example operations of a ratio method according to an aspect.

FIG. 6 is a flowchart 600 illustrating example operations of the ratio method 203 according to an aspect. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

Ratio of a UV value and an IR value may be computed (602). For example, the sensor processor 110 may compute the ratio of the value of the UV light data 106 and the value of the IR light data 108. The illuminant type probability may be detected from the ratio probability relationship using the computed ratio (604). For example, the sensor processor 110 may obtain the illuminant type probability 114 from the ratio probability relationship 210 using the ratio.

Figure 7:
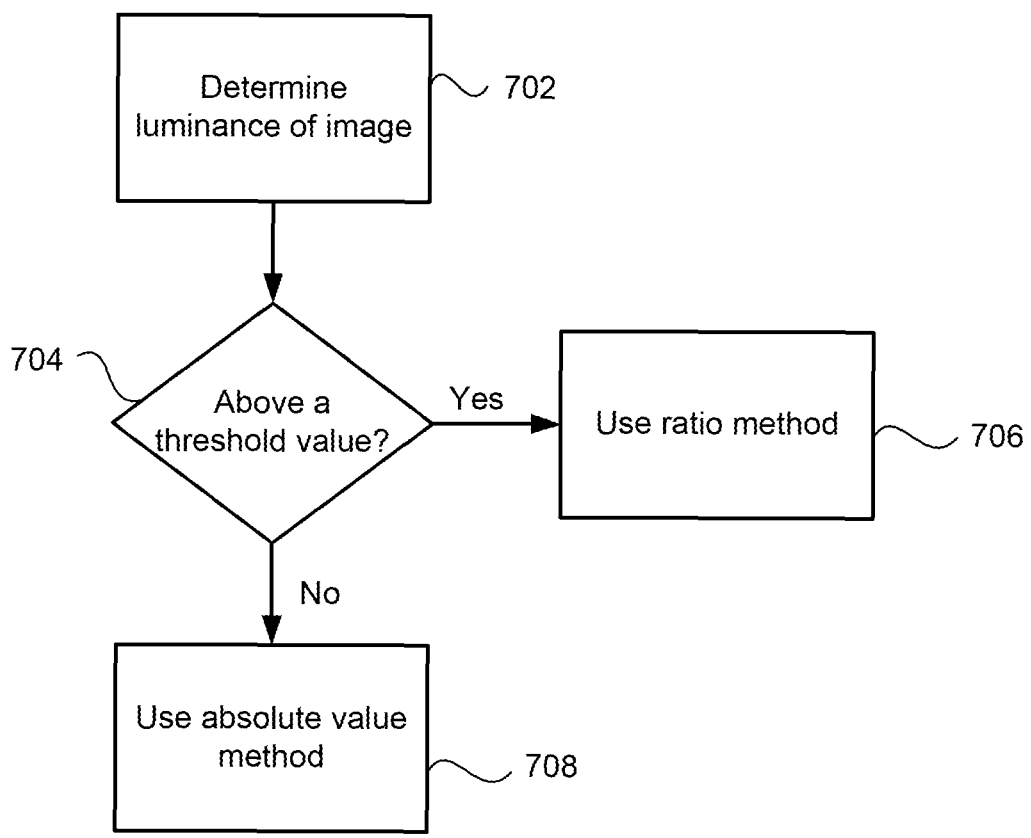
FIG. 7 is a flowchart illustrating example operations of the device of FIG. 1A according to an aspect.

FIG. 7 is a flowchart 700 illustrating example operations of the device 100 of FIG. 1A according to an aspect. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

A luminance of the image may be determined (702). For example, the sensor processor 110 may determine a luminance of the image 105. In some examples, the sensor processor 110 may determine the overall average luminance value of the image 105 using the individual pixel values.

It may be determined whether or not the luminance is above a threshold (704). For example, the sensor processor 110 may compare the luminance associated with the image 105 to a threshold. If yes, the ratio method may be used (706). For example, if the luminance is determined as above the threshold, the sensor processor 110 may determine the illuminant type probability 114 using the ratio method 203. If no, the absolute value method may be used (708). For example, if the luminance is determined as below the threshold, the sensor processor 110 may determine the illuminant type probability 114 using the absolute value method 201.

FIG. 8 is a flowchart 800 illustrating example operations of the AWB unit 116 of FIG. 1A according to an aspect. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion.

AWB statistical samples may be parsed (802). For example, the AWB unit 116 may parse AWB statistical samples of the image 102. AWB statistical samples may be screened and weighted (804). For example, the AWB unit 116 may parse screen and weight the AWB statistical samples with the probability data 112. In particular, in advance of an initial decision on an amount of the AWB gain for the image 105, the AWB unit 116 may incorporate the illuminant type probability 114 from the probability data 112 by weighing the AWB statistical samples of the image 105 with the illuminant type probability 114 from the probability data 112. In some examples, the AWB unit 116 may assign the probability based on the brightness of the scene. For example, if the ambient is 1000 lux, the AWB unit 116 may determine a low probability for the scene to be under tungsten light. Also, the probability assignment may be used for color preference (e.g., pictures under tungsten light are preferred to look yellower than bluer. An initial decision may be made (806). For example, the AWB unit 116 may make an initial decision regarding the amount of AWB gain.

According to some aspects, the illuminant type probability 114 of the probability data 112 may also (or alternatively) be incorporated into the decision modification heuristics and temporal heuristics. For example, the grey sample based decision rule may determine the initial decision, but other decision rules (e.g., heuristics) can be incorporated to change the decision. For example, in the past few frames, the illuminant history may be considered stable incandescent light and without scene brightness change or camera panning, and suddenly a decision of daylight is made for the current frame. This decision may be revoked or withheld until more daylight frames are received. With this, the AWB stability may be improved. Decision modification heuristics may be performed (808). For example, the AWB unit 116 may perform decision modification heuristics on the AWB statistical samples and the AWB gain. Temporal heuristics may be performed (810). For example, the AWB unit 116 may perform temporal heuristics on the AWB statistical samples and the AWB gain. For example, the AWB unit 116 may temporally weigh down the outliers to achieve AWB consistency. Convergence control may be performed (812). For example, the AWB unit 116 may perform convergence control to obtain the AWB gain and correlated color temperature (CCT) estimation.

Figure 9:
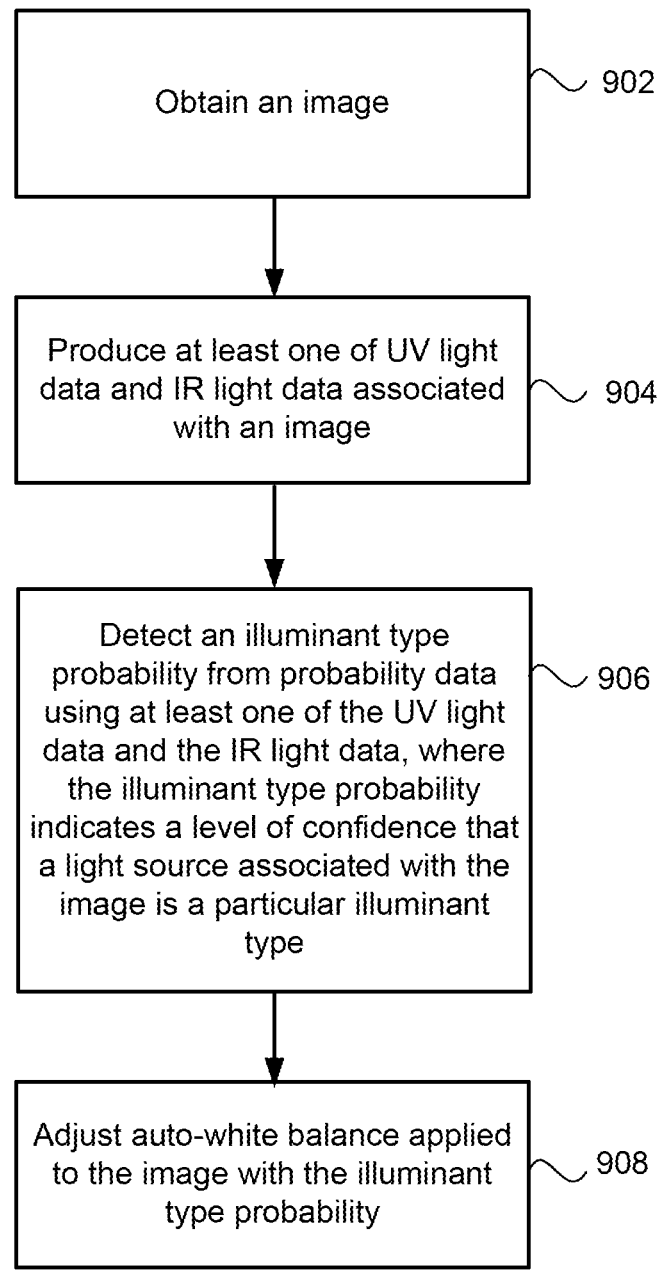
FIG. 9 is a flowchart illustrating example operations of the device of FIG. 1A according to an aspect.

FIG. 9 is a flowchart 900 illustrating example operations of the system of FIGS. 1 and 2 according to an aspect. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion.

An image may be obtained (902). For example, the camera 102 may obtain the image 105. The camera 102 may be a digital camera. In some examples, the camera 102 may be disposed on a front surface of the device 100 (e.g., front-facing camera). For example, the camera 102 may be disposed on the same side as a display screen 160 of the device 100. In some examples, the camera 102 may be disposed on a backside surface of the device 100 (e.g., back-facing camera disposed on the opposite side of the display screen 160). In some examples, the device 100 may include multiple cameras 102 (e.g., both the front-facing camera and the back-facing camera).

The image 105 may be an individual still image (e.g., photograph) or a sequence of images constituting a video or movie. The image 105 may be a digital image. The image 105 may be a numeric representation of a two-dimensional image having digital values called picture elements or pixels, where each pixel has a luminance value indicating a level of brightness.

At least one of UV light data and IR light data associated with the image may be produced (904). For example, the electromagnetic radiation sensor 104 may be configured to obtain at least one of the UV light data 106 and the IR light data 108 associated with the image 105. In some examples, the electromagnetic radiation sensor 104 may detect both the UV light data 106 and the IR light data 108. In some examples, the electromagnetic radiation sensor 104 is a single sensor component capable of detecting both the UV light data 106 and the IR light data 108. In other examples, the electromagnetic radiation sensor 104 may include separate sensor components such as a UV sensor configured to detect the UV light data 106 and an IR sensor configured to detect the IR light data 108. In some examples, the electromagnetic radiation sensor 104 may detect only the UV light data 106. In some examples, the electromagnetic radiation sensor 104 may detect only the IR light data 108. The UV light data 106 may include a UV value that represents a level of UV light associated with the image 105 (or a portion of the image 105). In some examples, the UV light data 106 include multiple UV readings such a first UV value captured at a first time and a second UV value captured at a second time subsequent to the first time. The IR light data 108 may include an IR value that represents a level of IR light associated with the image 105 (or a portion of the image 105). In some examples, the IR light data 108 may include multiple IR readings such as a first IR value captured at a first time and a second IR value captured at a second time subsequent to the first time.

The electromagnetic radiation sensor 104 may include an arrangement of one or more photodiodes, amplifiers, and/or analog and digital circuits. The electromagnetic radiation sensor 104 may be disposed proximate to the camera 102. In some examples, the electromagnetic radiation sensor 104 may be coupled to the camera 102. In some examples, the electromagnetic radiation sensor 104 and the camera 102 may share a power connection 118 and a computer bus 119. In some examples, the computer bus 119 is an Inter-Integrated Circuit (I2C) bus. In some examples, the device 100 may include multiple cameras 102, wherein only one of the cameras 102 shares a common power connection 118 and computer bus 119 with the electromagnetic radiation sensor 104. In some examples, the camera 102 configured as the front-facing camera shares the common power connection 118 and the computer bus 119 with the electromagnetic radiation sensor 104. In some examples, the camera 102 configured as the back-facing camera shares the common power connection 118 and the computer bus 119 with the electromagnetic radiation sensor 104.

An illuminant type probability may be detected from probability data using at least one of the UV light data and the IR light data, where the illuminant type probability indicates a level of confidence that a light source associated with the image is a particular illuminant type (906). For example, the sensor processor 110 may detect the illuminant type probability 114 from the probability data 112 using at least one of the UV light data 106 and the IR light data 108, where the illuminant type probability 114 indicates a level of confidence that the image's light source is a particular illuminant type. The probability data 112 may specify the probabilities for each illuminant type for various combinations of UV and IR values. In some examples, the probability data 112 may specify the probabilities for each illuminant type for various combinations of UR and IR values and luminance values associated with the image 105. The illuminant type probability 114 may refer to the level of confidence of the image's light source is a certain illuminant type such as daylight, fluorescent light, incandescent light, and/or visible LED light. Also, the illuminant type may include other classifications of light sources. In other words, an illuminant may refer to a light source, and the illuminant type may refer to the type of light source. In some example, the image 105 may include multiple light sources, and the sensor processor 110 may detect the illuminant type probability 114 for each light source present in the image 105.

Auto-white balance applied to the image may be adjusted with the illuminant type probability (908). For example, the AWB unit 116 may be configured to adjust the auto-white balance applied to the image 105 with the illuminant type probability 114. The AWB unit 116 may incorporate the illuminant type probability 114 into the AWB 117. As a result, the AWB unit 116 may not have to estimate the illuminant type using only the AWB statistical samples. In other examples, the AWB unit 116 may enhance the illuminant type estimation from the AWB statistical samples with the illuminant type probability 114 determined by the sensor processor 110.

Figure 10:
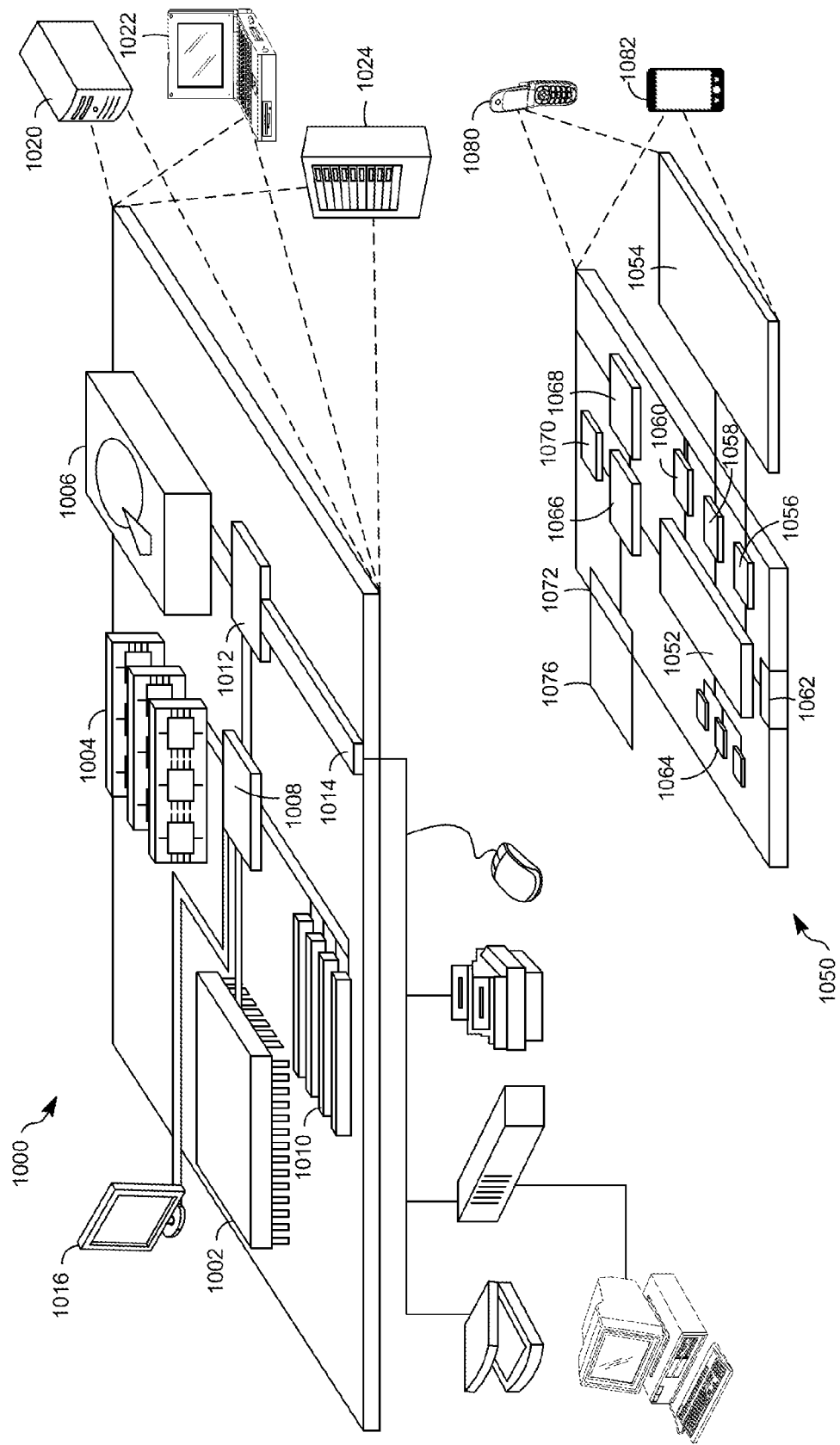
FIG. 10 is a block diagram showing example or representative computing devices and associated elements that may be used to implement the systems and methods of FIGS. 1-9.

FIG. 10 shows an example of a computer device 1000 and a mobile computer device 1050, which may be used with the techniques described here. In some examples, the device 100 may include the computer device 100 or the mobile computer device 1050. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, which may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A device comprising:
a camera configured to obtain an image;
an electromagnetic radiation sensor configured to produce ultra-violet (UV) light data and infrared (IR) light data associated with the image;
a sensor processor configured to determine an illuminant type probability from probability data using the UV light data and the IR light data, the illuminant type probability indicating a level of confidence that a light source associated with the image is a particular illuminant type, the sensor processor being configured to classify the light source as the particular illuminant type when the illuminant type probability is above a confidence threshold, the sensor processor configured to determine the illuminant type probability as being above the confidence threshold based on whether the UV light data is within a range of UV values and whether the IR light data is within a range of IR values; and
an auto-white balance unit configured to adjust auto-white balance with the illuminant type probability.

2. The device of claim 1, wherein the sensor processor is configured to determine that the light source associated with the image is daylight when the illuminant type probability is above the confidence threshold, the illuminant type probability being above the confidence threshold when the UV light data is above a first upper threshold and the IR light data is above a second upper threshold.

3. The device of claim 1, wherein the sensor processor is configured to determine that the light source associated with the image is fluorescent light when the illuminant type probability is above the confidence threshold, the illuminant type probability being above the confidence threshold when the UV light data is between an upper middle threshold and a lower middle threshold and the IR light data is below a lower threshold.

4. The device of claim 1, wherein the sensor processor is configured to determine that the light source associated with the image is incandescent light when the illuminant type probability is above the confidence threshold, the illuminant type probability being above the confidence threshold when the UV light data is between an upper middle threshold and a lower middle threshold and the IR light data is above an upper threshold.

5. The device of claim 1, wherein the sensor processor is configured to determine that the light source associated with the image is visible light emitting diode (LED) when the illuminant type probability is above the confidence threshold, the illuminant type probability being above the confidence threshold when the UV light data is below a first lower threshold and the IR light data is below a second lower threshold.

6. The device of claim 1, wherein the probability data includes a UV probability relationship and an IR probability relationship, the UV probability relationship providing an arrangement of UV values in relation to luminance values, the UV probability relationship indicating probabilities for combinations of the UV values and the luminance values, the IR probability relationship providing an arrangement of IR values in relation to the luminance values, the IR probability relationship indicating probabilities for combinations of the IR values and the luminance values.

7. The device of claim 1, wherein the probability data includes a ratio probability relationship providing probabilities for ratio values of IR values and UV values.

8. The device of claim 1, wherein the camera and the electromagnetic radiation sensor share an interface bus and a power connection.

9. The device of claim 1, wherein the camera is a front camera disposed on a same side of a display screen of the device.

10. A non-transitory computer-readable medium storing executable instructions that when executed cause at least one processor to:
  capture an image;
  produce ultra-violet (UV) light data and infrared (IR) light data associated with the image;
  determine whether a luminance associated with the image is above a threshold;
  determine an illuminant type probability from probability data using the UV light data and the IR light data according to a first method when the luminance is above the threshold, the illuminant type probability indicating a level of confidence that a light source associated with the image is a particular illuminant type;
  determine the illuminant type probability from the probability data using the UV light data and the IR light data according to a second method when the luminance is below the threshold, the second method being different than the first method; and
  adjust auto-white balance with the illuminant type probability according to the first method or the second method.

11. The non-transitory computer-readable medium of claim 10, wherein the probability data includes a UV probability relationship and an IR probability relationship, and the first method includes executable instructions that when executed cause the at least one processor to:
  determine an absolute value of the UV light data and an absolute value of the IR light data;
  obtain a UV probability from the UV probability relationship based on the absolute value of the UV light data;
  obtain an IR probability from the IR probability relationship based on the absolute value of the IR light data; and
  compute the illuminant type probability based on the UV probability and the IR probability.

12. The non-transitory computer-readable medium of claim 10, wherein the probability data includes a ratio probability relationship, and the second method includes executable instructions that when executed cause the at least one processor to:
  compute a ratio of a value of the UV light data and a value of the IR light data; and
  obtain the illuminant type probability from the ratio probability relationship using the ratio.

13. The non-transitory computer-readable medium of claim 10, wherein the illuminant type probability is determined as being above a confidence threshold based on whether or not the UV light data is within a range of UV values and whether or not the IR light data is within a range of IR values, the illuminant type probability being above the confidence threshold indicates that the light source can be classified as the particular illuminant type.

14. The non-transitory computer-readable medium of claim 10, wherein the executable instructions to adjust the auto-white balance include executable instructions that when executed cause the at least one processor to:
  incorporate the illuminant type probability from the probability data in advance of an initial decision on an amount of AWB gain including weighing AWB statistical samples of the image with the illuminant type probability from the probability data.

15. The non-transitory computer-readable medium of claim 14, wherein the executable instructions to adjust the auto-white balance include executable instructions that when executed cause the at least one processor to:
  incorporate the illuminant type probability from the probability data as part of decision modification heuristics and temporal heuristics.

16. A method comprising:
  obtaining, by a camera, an image;
  producing, by an electromagnetic radiation sensor, ultra-violet (UV) light data and infrared (IR) light data associated with the image;
  determining, by a sensor processor, an illuminant type probability from probability data using the UV light data and the IR light data according to either a first method or a second method, the illuminant type probability indicating a level of confidence that a light source associated with the image is a particular illuminant type; and
  adjusting, by an auto-white balance unit, auto-white balance with the illuminant type probability, the adjusting including:
    parsing AWB statistical samples of the image;
    weighting the AWB statistical samples with the illuminant type probability from the probability data;
    determining, as an initial decision, an amount of AWB gain based on the weighted AWB statistical samples; and
    performing heuristics on the AWB statistical samples and the amount of AWB gain determined as part of the initial decision.

17. The method of claim 16, wherein the probability data includes a UV probability relationship and an IR probability relationship, and the first method includes:
  obtaining a UV probability from the UV probability relationship using an absolute value of the UV light data and a luminance value associated with the image;
  obtaining an IR probability from the IR probability relationship based on an absolute value of the IR light data and the luminance value associated with the image; and
  computing the illuminant type probability by multiplying the UV probability with the IR probability.

18. The method of claim 16, wherein the probability data includes a ratio probability relationship, and the second method includes:
  computing a ratio of a value of the UV light data and a value of the IR light data; and
  determining the particular illuminant type of the light source and the illuminant type probability of the particular illuminant type from the ratio probability relationship using the ratio.

19. The method of claim 16, wherein
  the illuminant type probability from the probability data is also incorporated into the heuristics.

* * * * *